(12) United States Patent
Ichihashi

(10) Patent No.: US 6,535,529 B1
(45) Date of Patent: Mar. 18, 2003

(54) CROSS CONNECT APPARATUS CAPABLE OF REDUCING WORKLOAD OF OPERATOR

(75) Inventor: Masato Ichihashi, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/984,254

(22) Filed: Dec. 3, 1997

(30) Foreign Application Priority Data

Jun. 20, 1997 (JP) .............................................. 9-164606

(51) Int. Cl.$^7$ .............................. H04J 3/04; H04J 3/06; H04L 12/26
(52) U.S. Cl. ....................................... 370/535; 370/222
(58) Field of Search .............................. 370/535, 907, 370/216–228, 516, 517

(56) References Cited

U.S. PATENT DOCUMENTS

| | | | | |
|---|---|---|---|---|
| 4,815,069 A | * | 3/1989 | Nakayashiki et al. ......... | 370/16 |
| 5,488,501 A | * | 1/1996 | Barnsley ..................... | 359/137 |
| 5,495,472 A | * | 2/1996 | Ohara ........................ | 370/16.1 |
| 5,583,855 A | * | 12/1996 | Ball ............................ | 370/376 |
| 5,754,545 A | * | 5/1998 | Shinbashi et al. .......... | 370/360 |
| 5,872,780 A | * | 2/1999 | Demiray et al. ............ | 370/359 |
| 5,872,918 A | * | 2/1999 | Malomsoky et al. ..... | 395/200.5 |
| 5,903,370 A | * | 5/1999 | Johnson ...................... | 359/119 |
| 5,999,290 A | * | 12/1999 | Li ................................. | 359/127 |
| 6,122,250 A | * | 9/2000 | Taniguchi ................... | 370/222 |
| 6,137,800 A | * | 10/2000 | Wiley et al. ................ | 370/396 |

FOREIGN PATENT DOCUMENTS

JP 7-255073 10/1995

* cited by examiner

*Primary Examiner*—Alphus H. Hsu
*Assistant Examiner*—Toan Nguyen
(74) *Attorney, Agent, or Firm*—Katten Muchin Zavis Rosenman

(57) ABSTRACT

In a ring network, when a line setting operation is carried out, in order to simplify a cross connect setting operation, cross connect information into which information about a terminal NE and command information have been registered is transmitted from a transmission source NE, and this information passes through a node which is between terminal NE and terminal NE. Accordingly, a line setting manager is no longer required to perform a pass-through cross connect setting operation with respect to node which are between terminal NE and terminal NE, but merely transmits the cross connect information from the transmission source NE, so that the pass-though setting operation of the repeater NE and the cross connect setting operation of the terminal NE can be carried out.

6 Claims, 21 Drawing Sheets

FIG. 5

| Header Flag | A FROM NETWORK ELEMENT (NE) | B TO NETWORK ELEMENT (NE) | Command | Set | ADD | 1 | ⁎ ( — ) | ⁎ ( — ) | CRC |

| Header Flag | A FROM NETWORK ELEMENT (NE) | B TO NETWORK ELEMENT (NE) | Command | Rmove | Drop | 2 (Channel) | * ( — ) | * ( — ) | CRC |
|---|---|---|---|---|---|---|---|---|---|

FIG. 10

| Header Flag | A FROM NETWORK ELEMENT (NE) | D TO NETWORK ELEMENT (NE) | Command | Set | Add | Channel | * (—) | * (—) | CRC |

FIG. 11

| Header Flag | A FROM NETWORK ELEMENT (NE) | D TO NETWORK ELEMENT (NE) | Response | Set | Add | 3 (Channel) | NG | * (—) | CRC |

Fg : Header Flag
CMD : Command
RAP : Response

| Header Flag | A FROM NETWORK ELEMENT (NE) | B TO NETWORK ELEMENT (NE) | Command | Set | Add | Channel | * ( — ) | 2way | CRC |

CROSS CONNECT APPARATUS CAPABLE OF REDUCING WORKLOAD OF OPERATOR

BACKGROUND OF THE INVENTION

1. Field of the Invention

The present invention is related to a network technique capable of preventing erroneous connections during line setting operation in a network constituted by including a transfer apparatus having a cross connect function.

2. Description of the Related Art

In major networks connected via highspeed optical transmission paths, SONET (Synchronous Optical NETwork) is known in which a synchronized signal group (STS-n: Synchronous Transfer Signal/n=Multiplexing Layer) is directly multiplexed without applying a frame synchronization signal of a high order group.

Since the SONET is the synchronized highspeed transfer system, a network with a ring structure can be readily established. In general, LANs (Local Area Networks) employed in small-scale offices are also arranged by ring-shaped transfer paths. This SONET differs from LANs in that point that, as previously explained, a multiplexed high-speed synchronization signal is transmitted with a predetermined format structure (STS-n).

In the SONET, a basic signal frame STS-1 is constituted by an overhead (will be simply referred to as "header" hereinafter) corresponding to a control signal region, and a payload corresponding to an information storage region.

In a SONET, a node (repeater network element (NE)) is provided within a ring network, and a cross connect apparatus is provided with this node, through which a transfer signal received via a transmission path is added(Add), dropped(Drop), and passes(Pass through).

A difference between this cross connect apparatus and a switching unit (switchboard) is given as follows. The switching unit switches/connects data with respect to each call, whereas the cross connect apparatus determines a transfer path of data in a semi-fixed manner without being closed in response to external setting.

In FIG. 1, there is shown an arrangement of a ring network constituted by a NE "A", a NE "B", a NE "C", and a NE "D".

A cross connect setting operation is performed when the network is established, the line is newly added, or the line is changed. In this case, a network manager executes the cross connect setting operation with respect to a transfer apparatus such as a network management system NMS (Network Management System) from a monitoring/controlling apparatus for this transfer apparatus.

A description will now be made of an example of a cross connect setting operation in a ring network indicated in FIG. 19.

In this drawing, in such a case that a path is constituted by which information of a switching unit "A" (2001a) is transmitted via transfer apparatus A, B, C (2002a, 2002b, 2002c) to another switching unit "Z" (2001z), a signal frame of STS-1 (will be handled as "channel" and thus be expressed as an "x channel (xCH)" hereinafter) is firstly pass-set from a path HG2 to another path HG1 in the transfer apparatus B (2002b).

Next, the xCH is pass-set from the path HG2 to the path HG1 in the transfer apparatus C (2002c). Subsequently, a DROP setting operation is performed by which the xCH on the side of the path HG2 received in the transfer apparatus D (2002d) is transmitted to the switching unit Z (2001z). As described above, the cross connect setting operations must be sequentially carried out with respect to four sets of these transfer apparatus A, B, C, and D.

Also, with respect to the TSA function, since only the pass-setting operation of the same channel can be executed, the xCH must be unused in not only the transfer apparatus A/D, but also the transfer apparatus B/C. In other words, when each of the above-described transfer apparatus A to D is set, the cross connect setting condition of each of the four transfer apparatus A to D must be confirmed.

As represented in FIG. 19, when data is transferred from the transfer apparatus A (2002a) to the transfer apparatus D (2002d), the same channel not used among the four NE from the transfer apparatus A (2002a) to the transfer apparatus B (2002b) may be merely investigated. However, when a total NE number of transfer apparatus is larger than the four NE, the cumbersome investigation of the cross connect setting state is required.

Concretely speaking, in such a case that a ring network is constituted by 10 sets of transfer apparatus with respect to a transfer apparatus having a capacity of 48 channels in a single side, the cross connect setting operations are required 96(=48×2) times by simply calculating a total cross connect setting operation as to a single NE. In the case of such a network constitution, the cross connect setting operations are required (96×10) times. In another ring network arranged by N sets of NE, the cross connect setting operations are required (96×N) times. Furthermore, when ADD/DROP is considered, the cross connect setting operations must be executed (96×N×2) times.

As apparent from the foregoing descriptions, the larger the scale of this ring network is, the more the times of the cross connect setting operations are increased. When the times of the cross connect setting operations are increased, the probability that an erroneous setting operation happens to occur is necessarily increased. As a consequence, in order to set all lines within a large scale ring network without any erroneous setting operation, line setting workers should carry out very sensitive works for a very long period of time.

SUMMARY OF THE INVENTION

The present invention has been made the solve the above-described problems, and therefore, has an object to provide a cross connect apparatus capable of reducing a total work stage required when a setting worker performs a cross connect setting operation, so that a workload imposed on this setting worker is reduced, and thus the cross connect setting operation can be effectively performed.

A first means of the present invention is featured by that in a network through which a synchronized frame signal is multiplexed and the multiplexed frame signal is transferred, the cross connect apparatus is provided at a node connected to the network so as to control one of adding, dropping, and passing-through operations of the frame signal, comprising: control means for analyzing cross connect information contained in the frame signal with which a header is provided to thereby control setting of an own NE, the header containing the cross connect information for indicating whether a signal received from a predetermined node is dropped, or passes through.

As described above, in the transmission source NE, the information for the cross connect setting operation is produced. This information is stored into the header (overhead) of the frame signal (channel), and is notified via the ring network to such a terminal NE to be set via the repeater NE. As a result, it is possible to perform the cross connect setting operation even for a remote NE. Also, in a repeater NE for repeating this cross connect information, the content of this cross connect information is analyzed, so that, for instance, the own NE can execute the setting operation such as pass-through setting operation. As explained above, since the cross connect information successively passes through by using the frame signal (channel), the cross connect setting operations can be realized without any contradictory in and the terminal station, which have function adding, dropping and passing the transfer signal.

A second means is featured by that the control means includes cross connect information editing means for editing the cross connect information based upon an analysis result of the cross connect information.

For example, a transmission source NE, a terminal NE, and a command are registered into the cross connect information, so that since this registered information is analyzed by the terminal NE, the optimum setting operation to the own NE can be done.

A third means is featured by that when the control means recognizes that the own NE is a terminal NE, the control means performs a cross connect setting operation of the own NE based on the cross connect information; produces cross connect response information through the cross connect information editing unit; and returns the cross connect response information to a transmission source NE side.

The terminal NE terminates the cross connect in the own NE based upon the cross connect information produced in the transmission source NE so as to execute this setting operation, and also transmits to the transmission source NE, cross connect response information for indicating that the setting operation is carried out without any problem. Since this cross connect response information is finally received via the repeater NE to the transmission source NE, this transmission source NE can recognize that the cross connect can be set under normal condition.

A fourth means is featured by that in the above-described second means, when the cross connect setting operation of the own NE based on the content of the received cross connect information is not possible, the control means returns cross connect setting abnormal information corrected by the cross connect information editing means to a direction of a transmission source NE.

In such a case that the cross connect setting operation designated by the cross connect setting information cannot be performed in the repeater NE, or the terminal NE, for instance, when a failure happens to occur in a line, or a designated channel is already asigned for another connection, this relevant NE returns the cross connect setting abnormal information to the transmission source NE. As a consequence, the transmission source NE can recognize that the cross connect setting operation cannot be realized.

A fifth means is featured by that in the above-described fourth means, upon receipt of the cross connect setting abnormal information, the control means removes the cross connect setting operation executed when cross connect information corresponding to the cross connect setting abnormal information is received.

Since this cross connect abnormal information is returned, the repeater NE and the like can remove the cross connect setting operation. Accordingly, the useless cross connect setting operation can be avoided.

A sixth means is featured by that in the above-explained first means, the control means includes timer means; commences a measurement by the timer means when the cross connect setting information is received; and returns the cross connect setting abnormal information to a direction of a transmission source NE when the cross connect response information is not received within preset time.

Since the timer is employed, when the cross connect response information cannot be received within the preset time, the repeater NE can separately produce the cross connect setting abnormal information. As a consequence, the cross connects previously set to the NE located prior to the failure NE can be sequentially removed.

A seventh means is featured by that in the above-described sixth means, when the cross connect response information is not received within the time preset by the timer means, the control means returns the cross connect setting abnormal information to the transmission source NE side, and returns cross connect remove information to a reception NE side.

As a consequence, the cross connect setting abnormal condition is notified to the transmission source side, and also the cross connect setting operation previously set in the terminal side. For instance, even when only a single-sided channel of bidirection channels is brought into a failure condition, the cross connect setting operations of both channels can be correctly removed.

BRIEF DESCRIPTION OF THE DRAWINGS

A more complete understanding of the teachings of the present invention may be acquired by referring to the accompanying figures, in which like reference numbers indicate like features and wherein:

FIG. 5 is an explanatory diagram for showing a data content of cross connect information transmitted from a NE "A" employed in the embodiment mode of the present invention;

FIG. 10 is an explanatory diagram for showing a data content of cross connect information transmitted from the NE A to the NE D in the embodiment mode of the present invention;

FIG. 11 is an explanatory diagram for showing a data content of cross connect setting abnormal information returned from the NE B to the NE A in the embodiment mode of the present invention;

DETAILED DESCRIPTION OF THE PREFERRED EMBODIMENTS

Figure 20:
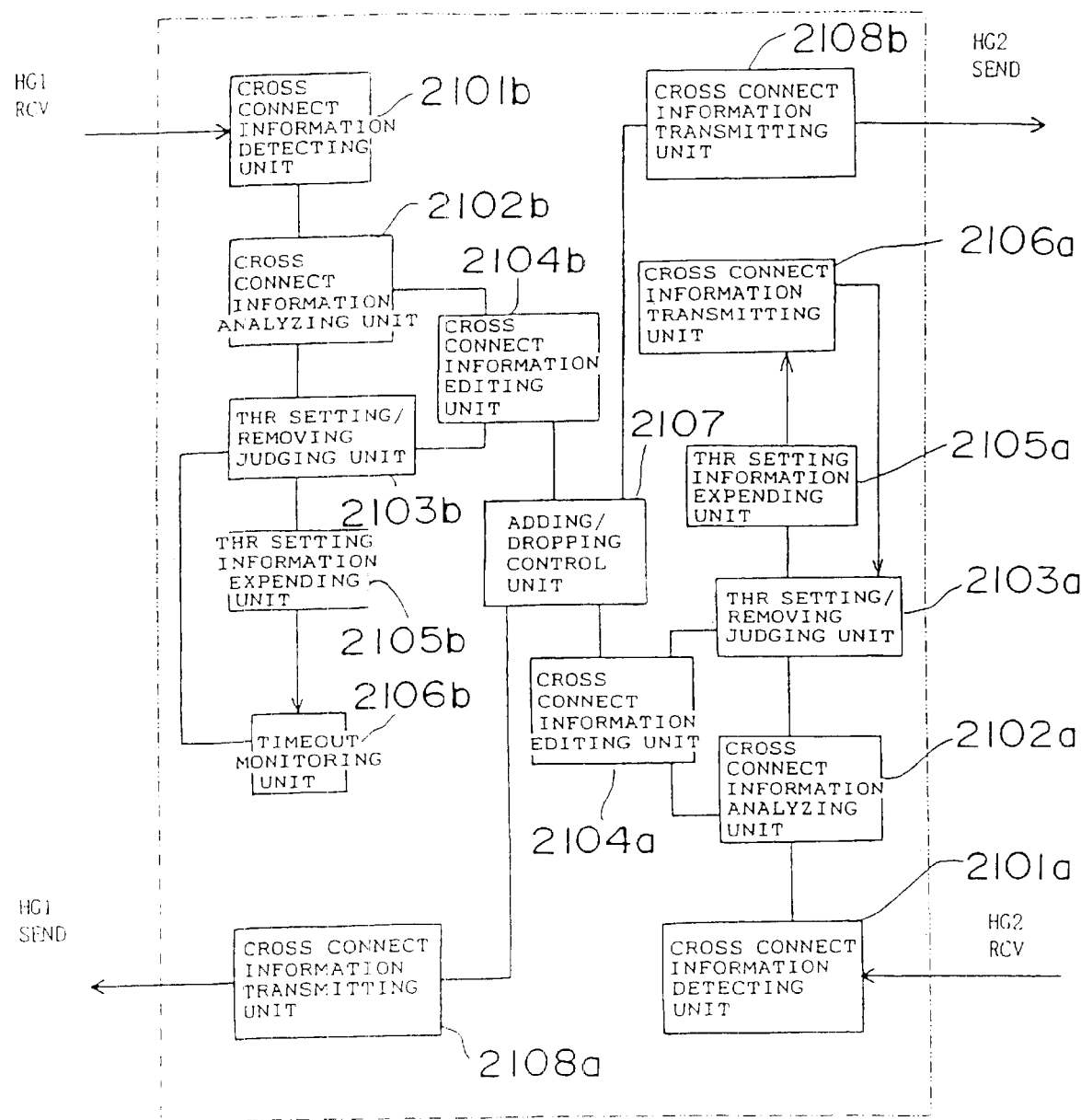
FIG. 20 is a schematic block diagram for indicating a functional arrangement of a cross connect apparatus in the embodiment mode of the present invention.
Figure 21:
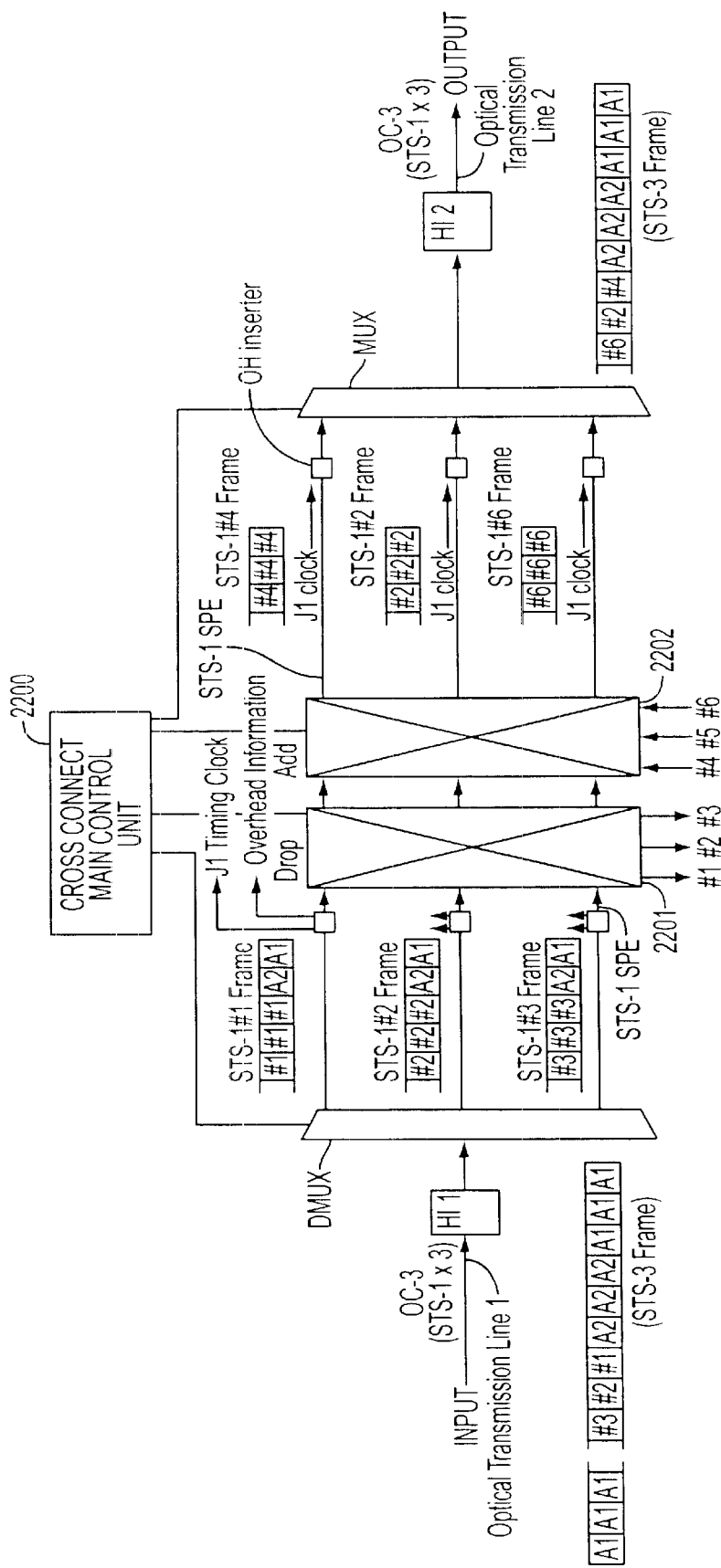
FIG. 21 is a schematic block diagram for showing an overall arrangement of the cross connect apparatus in the embodiment mode of the present invention.
Figure 22:
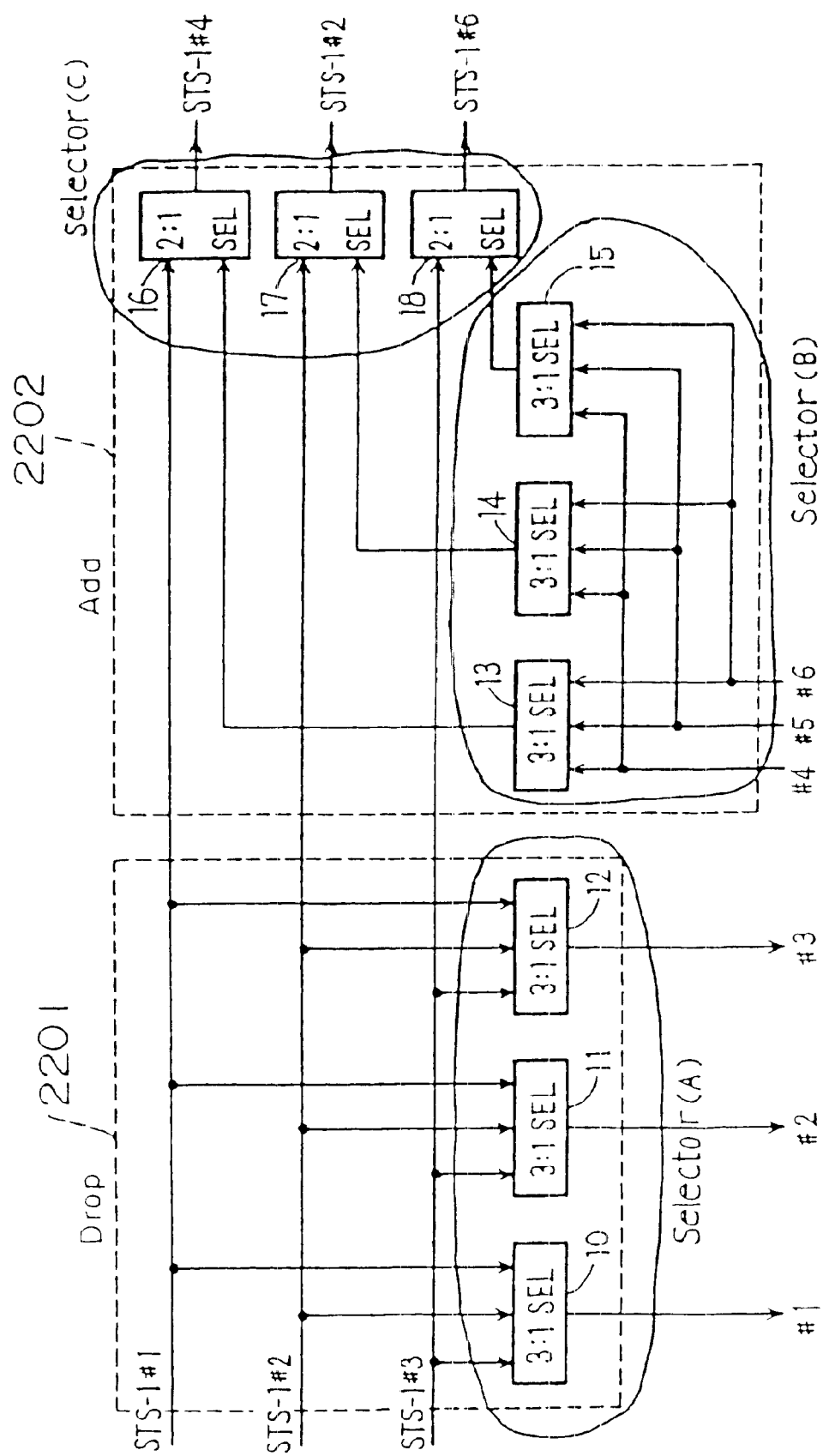
FIG. 22 is a schematic block diagram for indicating an arrangement of an adding/dropping apparatus in the embodiment mode of the present invention.

FIG. 20 is a functional arrangement diagram of a cross connect main control unit employed in a cross connect apparatus according to an embodiment mode of the present invention, FIG. 21 represents an overall arrangement of the cross connect apparatus, and FIG. 22 shows an adding/dropping apparatus.

The cross connect apparatus is controlled by a cross connect main control unit 2200, and is mainly constructed of a demultiplexer (DMUX), an adding/dropping apparatus (2201, 2202), and a multiplexer (MUX) provided on the reception side.

As shown in FIG. 22, the adding/dropping apparatus (2201, 2202) is arranged by 3 series of selector groups from a selector "A" to a selector "C". These selector groups are controlled, so that the received frame signal can be dropped (Drop), added(Add), and can pass through(Pass Through).

In the cross connect apparatus, as indicated in FIG. 21, the following operations can be performed:

(1). A frame signal of OC-3 (STS–1×3/approximately 450 Mbps) is received, and this received frame signal is demultiplexed into STS–1 frame signals in three channels by the demultiplexer(DMUX).

(2). A header (Overhead) contained in each of the demultiplexed STS–1 frame signals is derived so as to extract timing of a J1 (byte signal indicative of starting position of payload frame), and a reception clock.

(3). Next, any one of the respective STS–1 SPE (Synchronous Payload Envelope) signals for deriving the header of the STS–1 frame, and/or all of these STS–1 SPE signals are dropped by the dropping unit 2201 to be selected, so that these signals can be acquired by an own NE.

(4). Also, the STS–1 SPE signals less than 3 channels, which are externally supplied, are selected, so that these selected signals are acquired by the adding unit 2202, and then can be outputted to the multiplexer (MUX).

Also, the frame signals STS–1 #1 to STS–1 #3 are selected as an input to the selector C in the adding unit 2202, so that the received frame signal STS–1 can pass through the own NE.

Such a cross connect apparatus is employed in each of the transfer apparatus "A" to "F" as explained with reference to FIG. 19.

Figure 19:
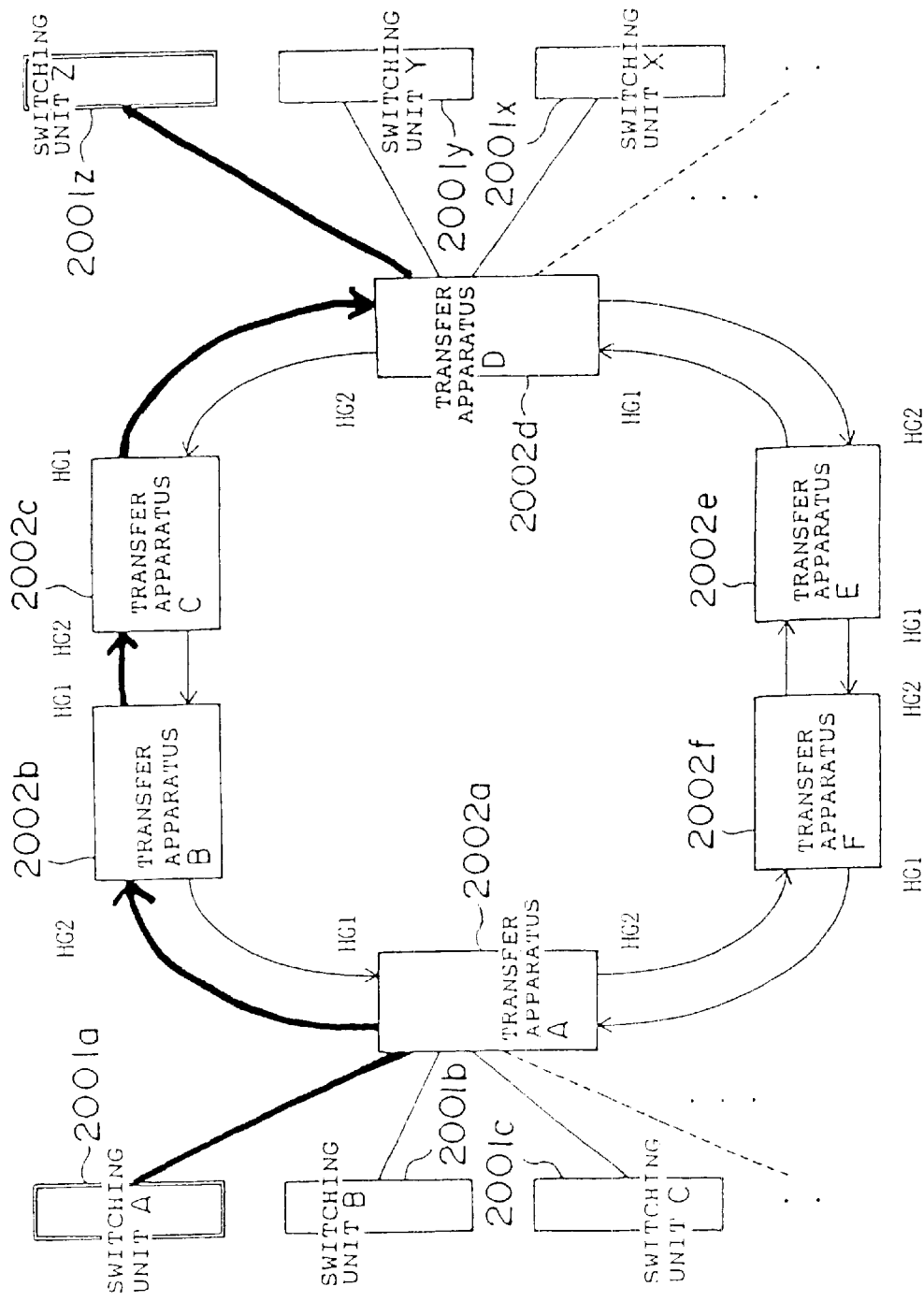
FIG. 19 is an explanatory diagram for indicating a ring network arrangement of the present invention.

Assuming now that this transfer apparatus corresponds to the transfer apparatus D (2002d) shown in FIG. 19, the same function units are provided on the HG2 side (side of transfer apparatus C) and the HG1 side (side of transfer apparatus E) in the cross connect apparatus of this transfer apparatus D In FIG. 20, it should be understood that constructive elements having the same reference numerals own the same functions irrelevant to alphabets attached to final portions thereof.

Figure 4:
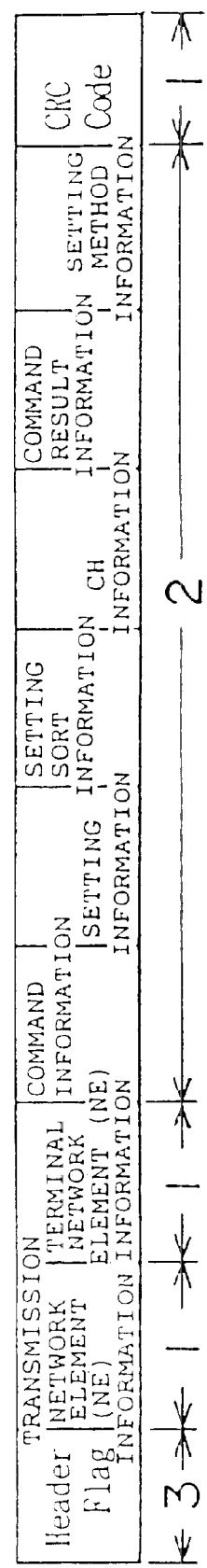
FIG. 4 is an explanatory diagram for showing a format of cross connect information used in the embodiment mode of the present invention.

A cross connect information detecting unit 2101a owns a function capable of detecting existence of cross connect information (as shown in FIG. 4) from data. A cross connect information analyzing unit 2102a analyzes this cross connect information, and then conducts the analyzed cross connect information to a cross connect information editing unit 2104a so as to edit the cross connect information, or to a pass-through setting/removing judging unit 2103a, if necessary. In the pass-through setting/removing judging unit 2103a, based on the cross connect information conducted from either the cross connect information analyzing unit 2102a or the cross connect information editing unit 2104a, an adding/dropping control unit 2107a issues such an instruction that this cross connect information is returned via a cross connect information transmitting unit 2108b to the transfer apparatus C provided on the HG2 side, otherwise returned via another cross connect information transmitting unit 2108a to the transfer apparatus E provided on the HG1 side.

An adding/dropping control unit 2107 owns a function for executing a main control of a cross connect setting operation for a relevant NE. In response to an instruction issued from this adding/dropping control unit 2107, setting and removing of the above-described pass-through (Pass Through) are executed.

It should be noted that the pass-through setting/removing judging unit 2103a reads out time-out time from the setting information extended by a pass-through setting information extending unit 2105a, and sets time-out time of a time out monitoring unit 2106a.

Figure 23:
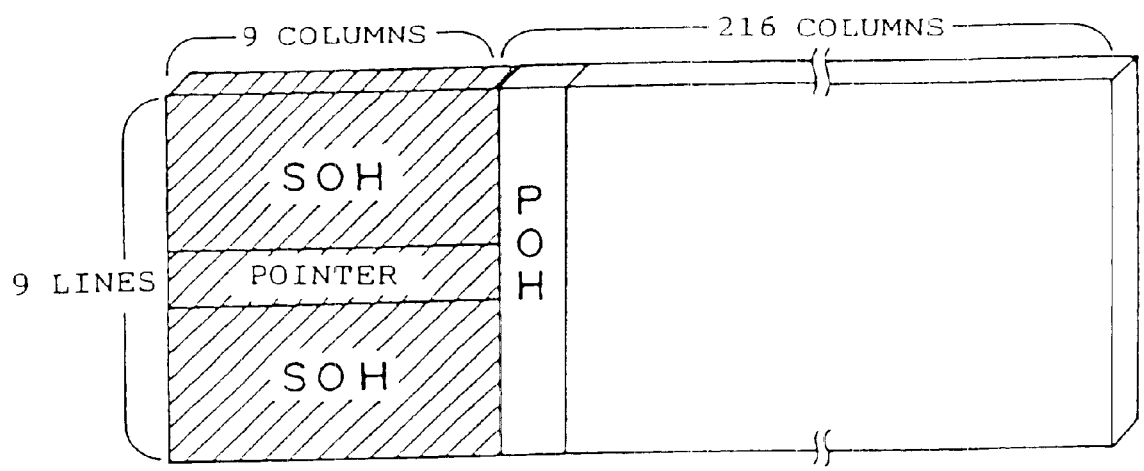
FIG. 23 is an explanatory diagram for representing a format of a frame signal.
Figure 24:
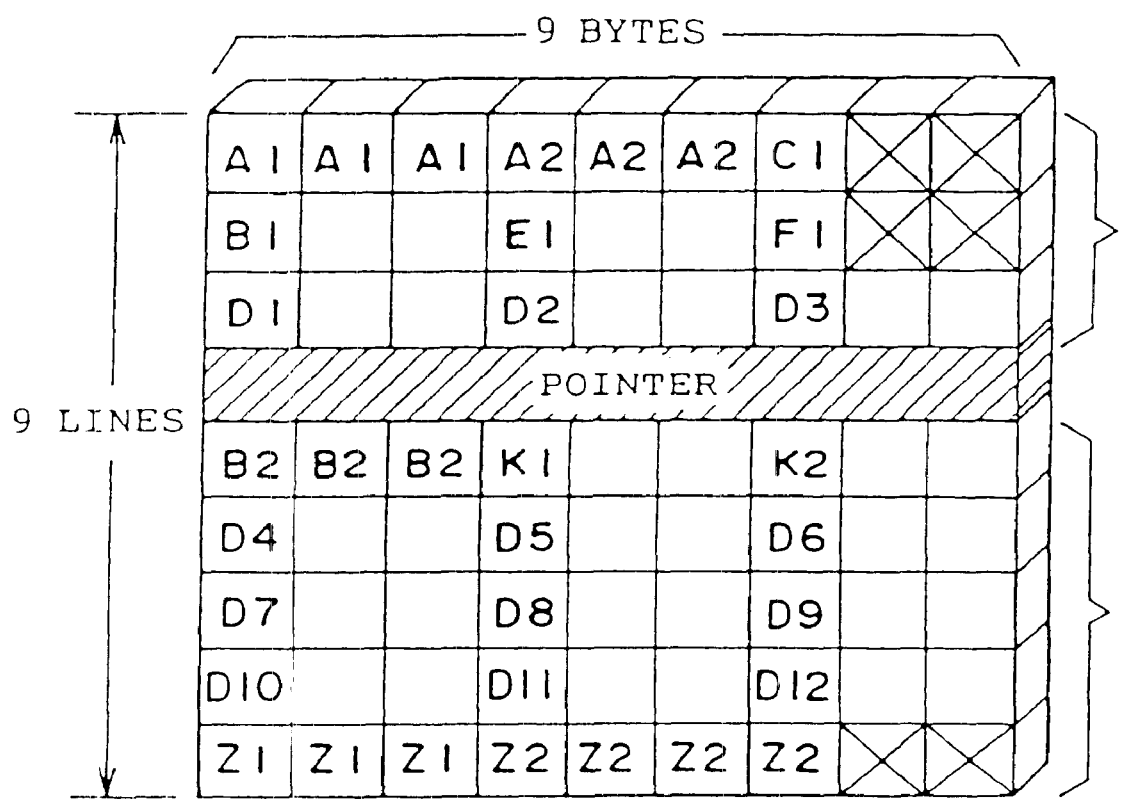
FIG. 24 is an explanatory diagram for indicating a format of a header of the frame signal.

In this embodiment, a format of a frame signal is represented in FIG. 23. As shown in these drawings, the frame signal owns a 9×9-byte header constituted by an STS overhead containing a section pointer. A format structure inside this header is indicated in FIG. 24. In this format structure, symbol "Z1" shows a multiplex spare region, and the cross connect information can be stored by employing this Z1.

As indicated in FIG. 4, the cross connect information contains a header flag of 3 octets, transmitting NE information of 1 octet, terminal NE information of 1 octet, a payload of 2 octet used to store various sorts of information, and CRC check information constructed of 1 octet.

The header flag corresponds to a flag indicative of a head of cross connect information. As the transmitting NE information, an ID(identification) of a transmission source NE of this cross connect information, namely an ID of a NE (for example, transfer apparatus A) into which a command is inputted is registered. Into the terminal NE information, an ID of a transmission destination NE of the cross connect information, namely an ID of the terminal NE of this cross connect information is registered.

Into the command information of the payload, such a fact whether this cross connect corresponds to setting command information(Command), or response information(Response) is registered. Into the setting information, such a fact whether this cross connect corresponds to a setting command(Set), or a removing command(Remove) is registered. Into the setting sort information, such a fact whether this cross connect corresponds to ADD information, or DROP information is registered. Into the channel(CH) information, such a channel that this cross connect is set/removed is registered. Into the command result information, such a fact whether a process operation by this cross connect is executed under normal condition (OK), or not (NG) is registered. Into the setting method information, such a fact whether this cross connect information is provided for one direction (1WAY), or two directions (2WAY) is registered.

Process Operation When Cross Connect Is Set

Figure 1:
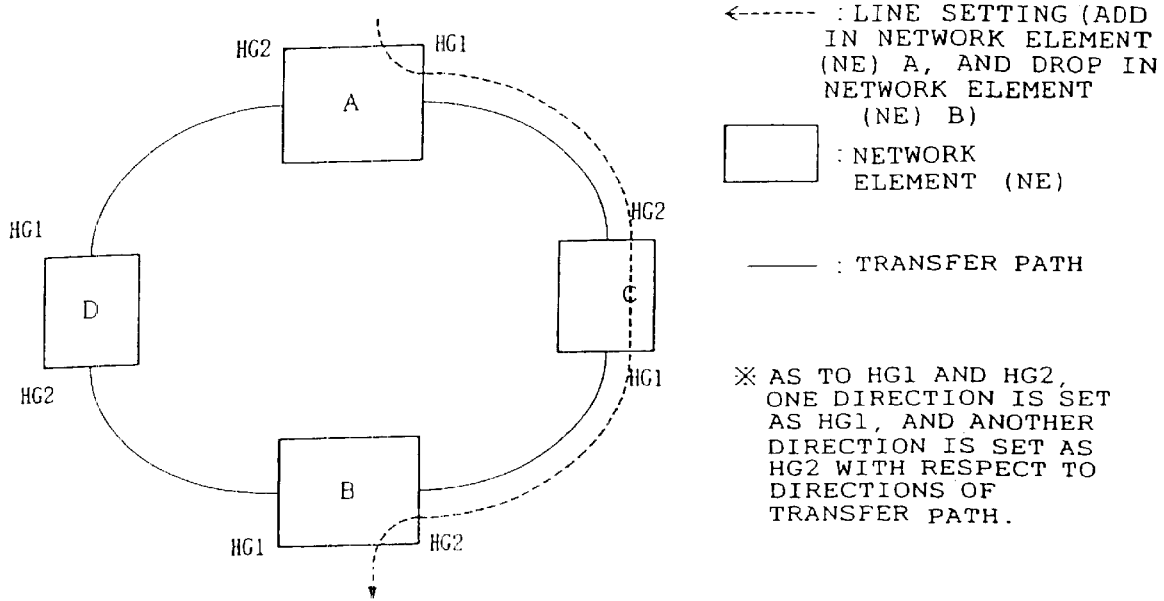
FIG. 1 is an explanatory diagram for indicating a network arrangement according to an embodiment mode of the present invention.
Figure 2:
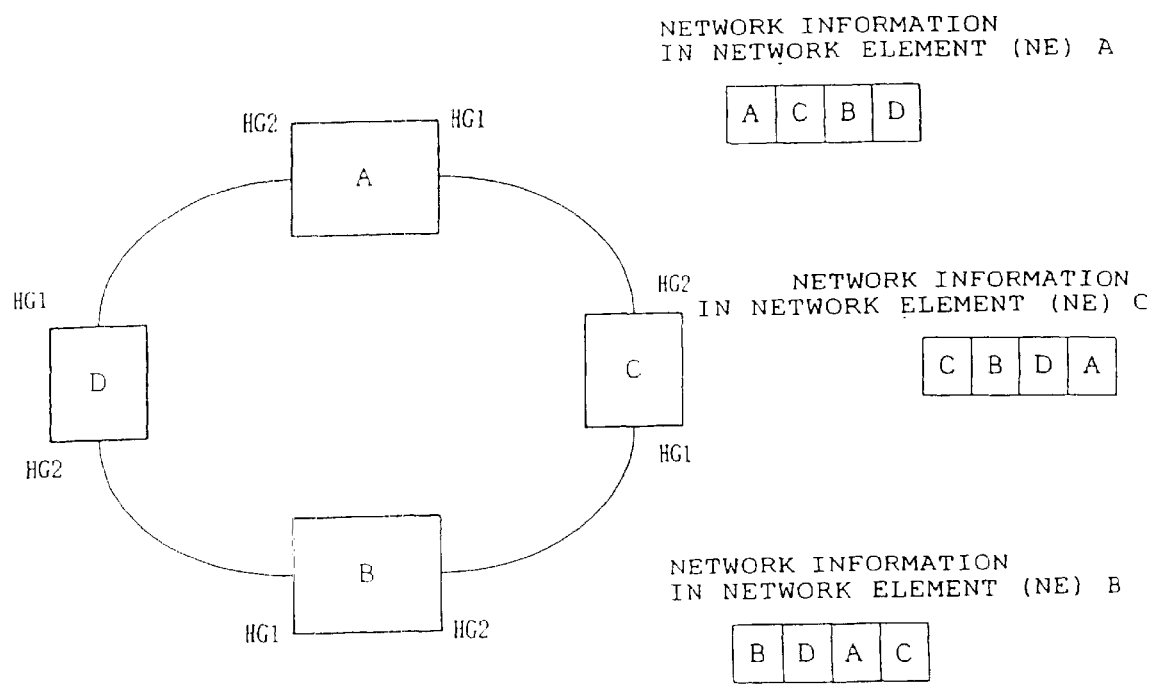
FIG. 2 is an explanatory diagram for indicating a network arrangement according to an embodiment mode of the present invention.

As an initial condition, while the above-described cross connect apparatus and cross connect information are employed, a description will now be made of such a case that the cross connect setting operation is carried out from the NE A to the NE B in the ring network arrangement as an example, as shown in FIG. 2. In this network, each of the NE owns the own specific network information, as illustrated in FIG. 2. This network information is "A, C, B, D" in the NE A; is "C, B, D, A" in the NE C; and is "B, D, A, C" in the NE B.

Figure 3:
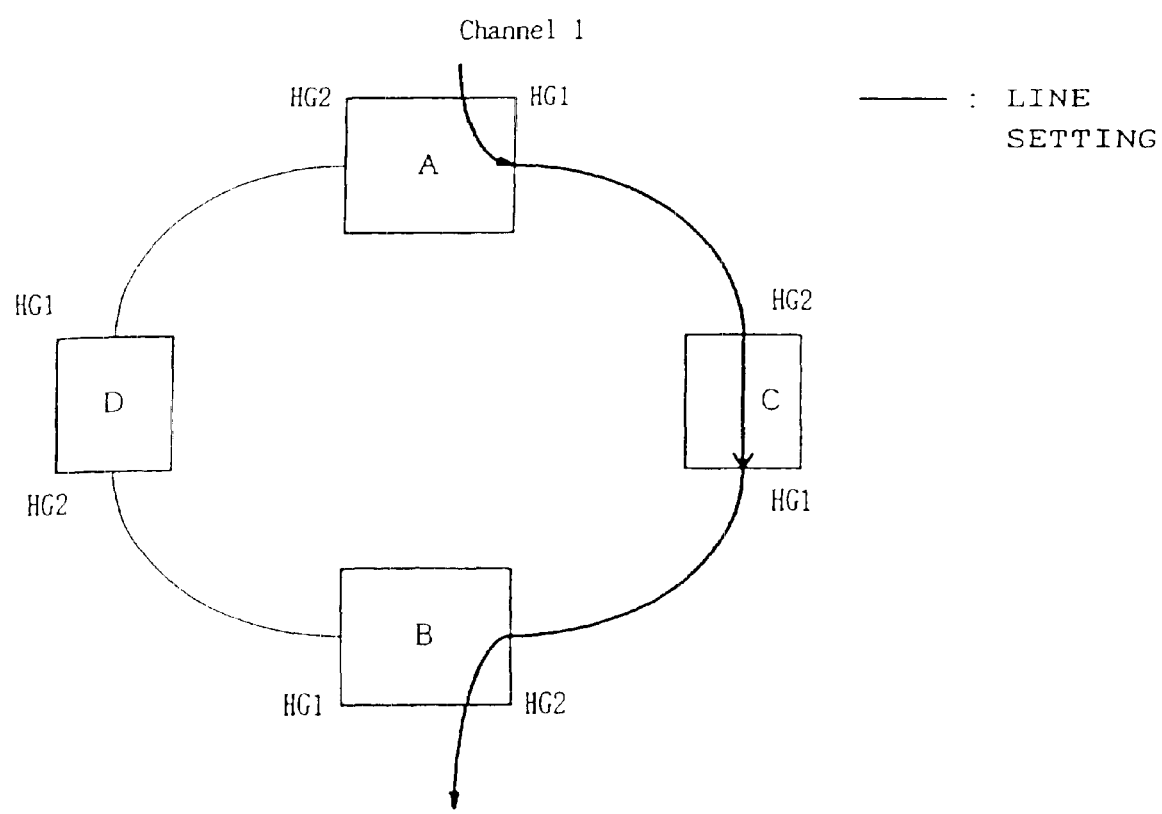
FIG. 3 is an explanatory diagram for representing a network arrangement used to perform a cross connect setting operation according to an embodiment mode of the present invention.

First, considering such a case that in the NE A, the ADD setting operation is performed by using the first channel (Channel-1) on the HG1 side as shown in FIG. 3, and then this is dropped in the NE B to perform the cross connect setting operation in the NE B.

The cross connect information as explained in FIG. 4 is transmitted from the NE A to the HG1 side (namely, on the side where cross connect setting operation is carried out) by utilizing the overhead data. A content of the cross connect information is indicated in FIG. 5 at this time. In other words, an ID (for the sake of convenience, indicated as "A" in this drawing) indicative of the NE A equal to the transmission source NE is registered into the transmission source NE information, and another ID (for the sake of convenience, indicated as "B" in this drawing) indicative of the NE B equal to the final reception NE is registered into the terminal NE information. Also, "Command" equal to the setting command is registered into the command information, and "Set" equal to the setting command is registered into the setting information. Furthermore, "ADD" is registered into the setting sort information, and "1" equal to the channel number thereof is registered into the channel information.

First, such cross connect information is received by the NE C. In this case, inside the cross connect apparatus of the NE C, the cross connect information is detected by the cross connect information detecting unit 2101, and a check is made as to whether or not the command information within the cross connect information received by the cross connect information analyzing unit 2102 corresponds to "Command". Next, the cross connect information analyzing unit 2102 reads out the terminal NE information. In this case, in accordance with this information, the terminal NE is registered as the NE B. Since this NE B is different from the ID indicative of the own NE (namely, NE C), the pass-through setting/removing judging unit 2103 judges the pass-through setting operation.

Next, the cross connect information analyzing unit 2102 reads out the setting sort information (namely, "ADD" in this example), and the own NE (NE C) recognizes that the pass-through setting operation should be carried out from the side where the cross connect information is received (HG1) to the transmission side (HG2).

Finally, the cross connect information analyzing unit 2102 recognizes that since the channel information contained in the cross connect information is "Channel-1", the pass-through setting operation to be set corresponds to the channel 1. From these facts, the adding/dropping control unit 2107 can judge that "pass-through setting of channel 1 must be carried out from HG1 to HG2".

Furthermore, the received cross connect information is transmitted toward the HG1 side (namely, cross connect information path pass-through process).

As previously explained as to the NE C, even when there are plural pass-through NE between the NE A and the NE B, a similar setting operation to that executed in the NE C is performed in these pass-through NE.

Removing of Cross Connect Setting

Figures 6, 7:
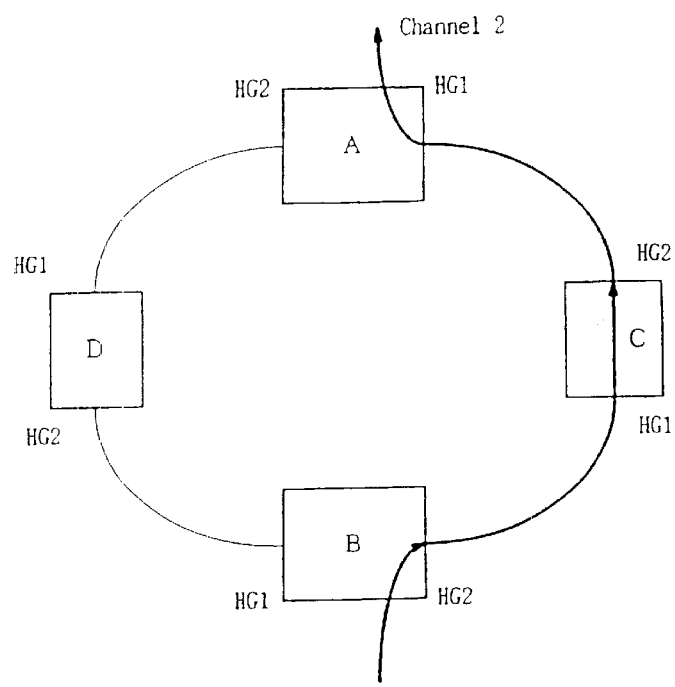
FIG. 6 is an explanatory diagram for representing a network arrangement used to remove the cross connect setting operation according to the embodiment mode of the present invention.
FIG. 7 is an explanatory diagram for showing a data content of cross connect information transmitted from the NE A according to the embodiment mode of the present invention.

Next, as indicated in FIG. 6, when the cross connect setting operation is made from the NE A to the NE B, a description will now be made of such an example that this cross connect setting operation is removed.

The cross connect information as shown in FIG. 7 is transmitted from the NE A to the HG1 side. Then, the NE C which has received this cross connect information executes the below-mentioned process operations.

The cross connect information analyzing unit 2102 of the NE C reads out the command information of the cross connect information, and then identifies that since the read command information corresponds to "Command", this command information is related to the cross connect setting/removing information. Then, the cross connect information analyzing unit 2102 reads out the setting information, and recognizes that since the read setting information corresponds to "Remove" and further the terminal NE information is equal to the ID of the NE B different from the own NE (NE C), the pass-through setting of the own NE must be removed.

Furthermore, the pass-through setting/removing judging unit 2103 recognizes that since the setting sort information corresponds to "DROP", the pass-through setting operation from the side (HG1) where the cross connect information is transmitted to the side (HG2) where this cross connect information is received must be removed in the NE C.

Finally, the cross connect information analyzing unit 2102 recognizes that since the channel information contained in the cross connect information corresponds to "Channel-2", the pass-through setting operation to be removed is the second channel.

From these facts, the adding/dropping control unit 2107 finally recognizes that "the pass-through setting operation set from the HG1 of the second channel to the HG2 is removed", and executes the path pass-through process operation of the cross connect information in the own NE.

As previously explained as to the NE C, even when there are plural pass-through NE between the NE A and the NE B, a similar setting operation to that executed in the NE C is performed in these pass-through NE.

In Case That Pass-Through Cross Connect Setting Is Not Allowed

Figure 8:
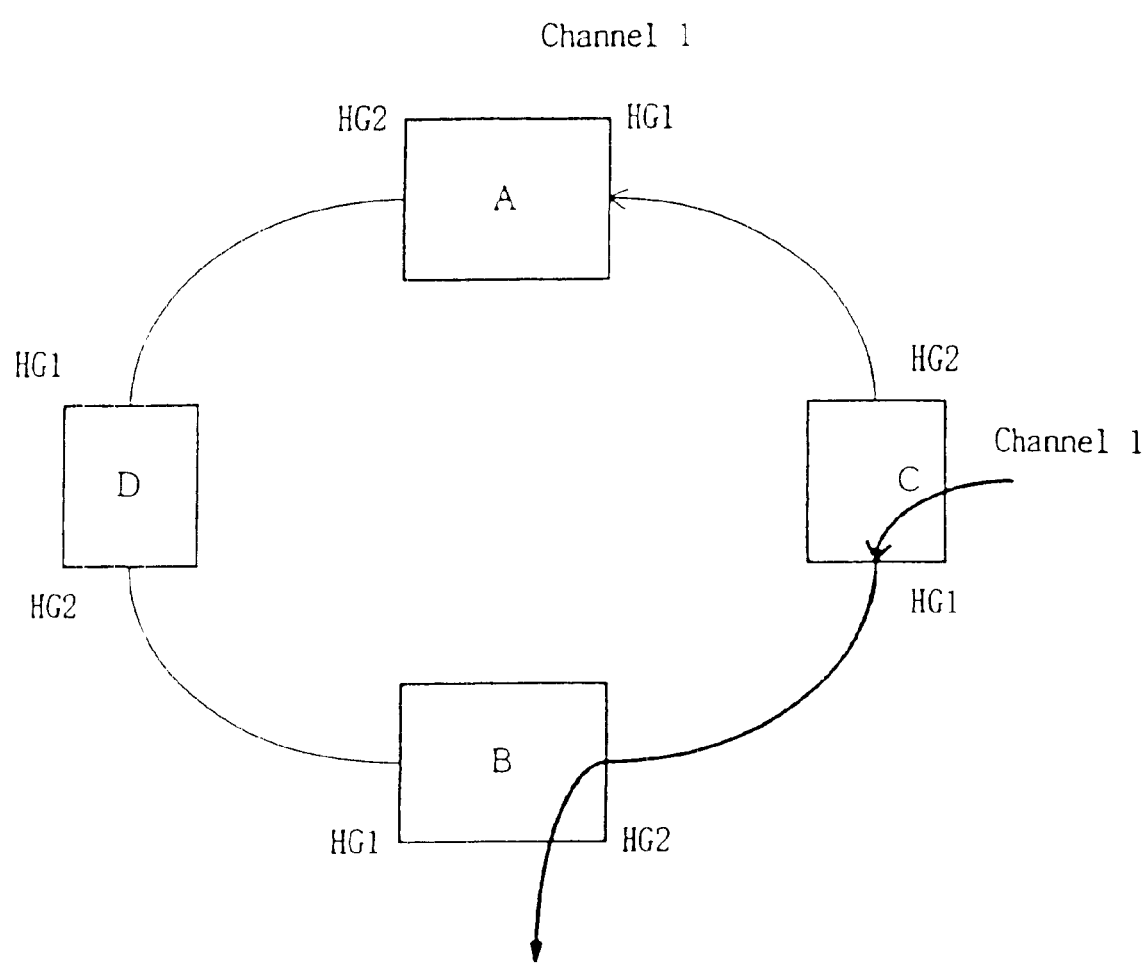
FIG. 8 is an explanatory diagram for representing a condition under which a first channel is used to communicate between a NE C and a NE B in the embodiment mode of the present invention.

As shown in FIG. 8, in such a case that the NE C has already established the communication with the NE B by using the first channel (Channel-1), if the pass-through setting operation is carried out for the first channel, then the communication established between the NE C and the NE B is interrupted. Therefore, no pass-through setting operation can be performed for the first channel. In such a case, no pass-through setting operation is carried out in the NE C.

Concretely speaking, in such a case, the cross connect information analyzing unit 2102 recognizes that the own NE (namely, NE C) must perform the pass-through setting operation based upon the transmission NE information, the terminal NE information, and the channel information. However, as previously explained, the channel designated by the NE C (namely, Channel-1) has already been used. Therefore, in the adding/dropping control unit 2107, no pass-through setting operation is performed, and this cross connect information is terminated in the own NE (NE C). A response process operation made for the NE A will be described later.

As described above, the cross connect information in the concrete example is not reached to the NE B. Also, under similar condition in such a case that a plurality of NE are further interposed between the NE C and the NE B (in such a case that designated channel has already been used), no cross connect setting operations are carried out in these repeater NE.

Figure 14:
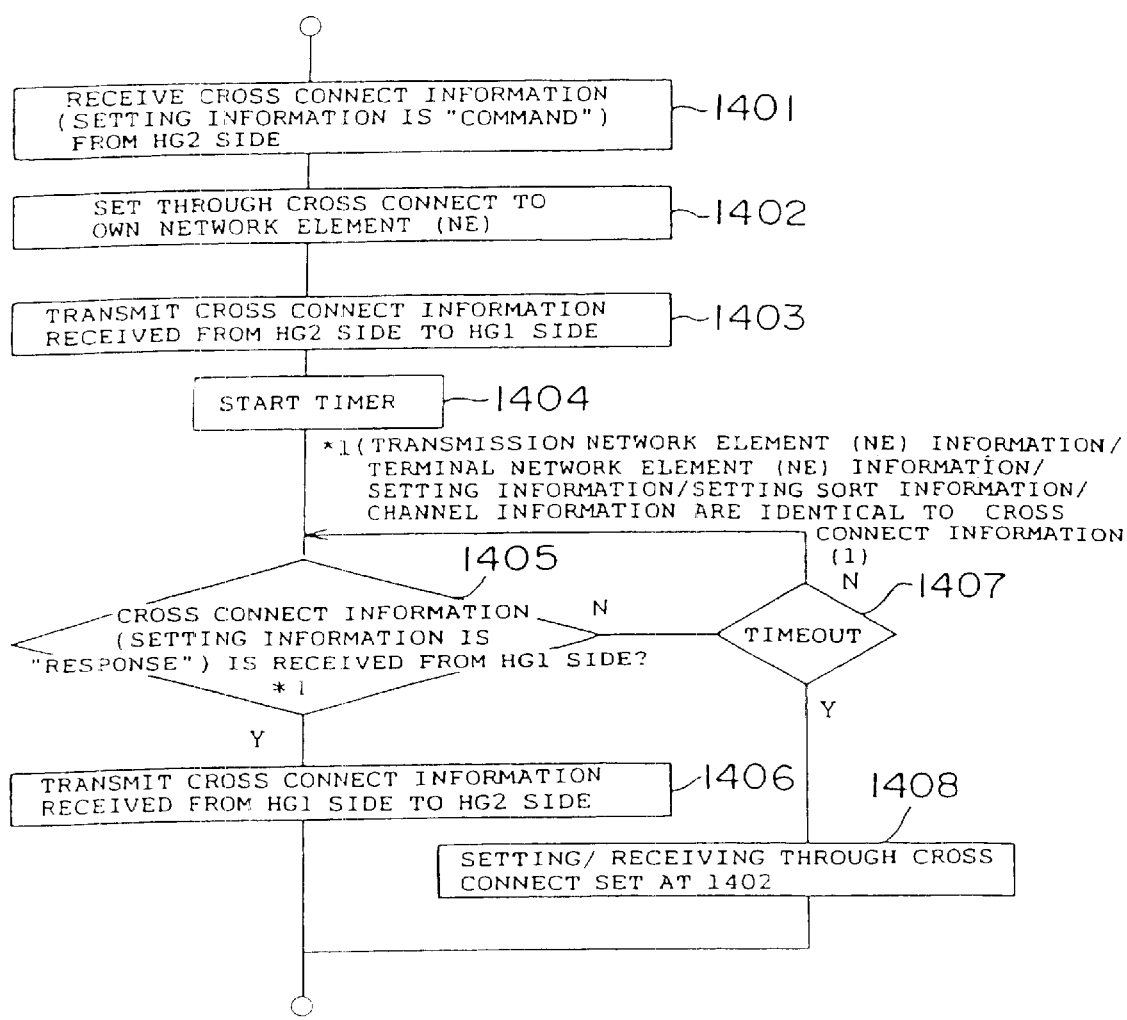
FIG. 14 is a flow chart for describing a time out monitoring process operation executed in a repeater NE (NE C) in the embodiment mode of the present invention.

Also, in such a case that a failure happens to occur between the NE C and the NE B, as shown in FIG. 14, since the pass-through process operation of the cross connect information cannot be performed in the NE C, the cross connect information transmitted from the NE A is terminated in the NE C.

Figure 9:
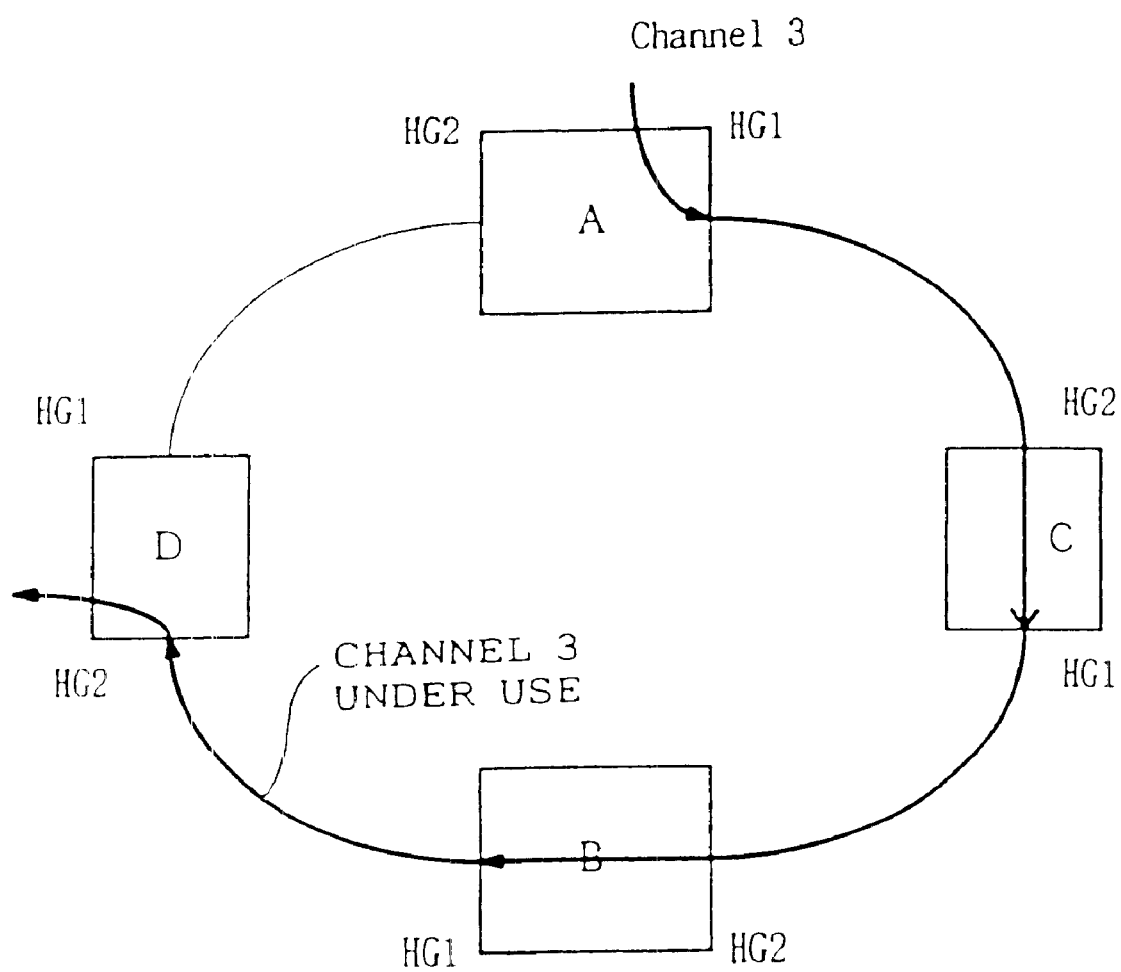
FIG. 9 is an explanatory diagram for indicating a condition that a third channel between a NE B and a NE D has already been used in the embodiment mode of the present invention.

Removing of Setting Operation When Pass-Through Cross Connect Setting Is Not Allowed As indicated in FIG. 9, such a cross connect setting operation will now be explained in the case that an ADD communication is performed in a third channel (Channel-3) on the HG1 side of the NE A via the NE C and the NE B with the NE D.

As represented in FIG. 10, cross connect information is transmitted from the NE A corresponding to the transmission NE to the HG1 side. When the cross connect information has reached up to the NE B, if the cross connect process operation cannot be executed due to a similar reason when the above-explained pass-through cross connect setting operation cannot be allowed, for instance, when the third channel (Channel-3) is under use between the NE B and the NE D, the cross connect is terminated in the NE B similar to the above case that the pass-through cross connect setting operation cannot be allowed.

Next, in the cross connect information editing unit 2104 of the NE B, as indicated in FIG. 11, the command information of the cross connect information is rewritten from "Command" to "Response". Then, "NG" is written into the command result information.

Next, the adding/dropping control unit 2107 transmits this cross connect information via the cross connect information transmitting unit 2108 to the HG2 side equal to the information receiving direction. The cross connect setting abnormal information shown in FIG. 11 is returned from the NE B via the NE C to the NE A. In this NE A, the NE A recognizes that the cross connect setting operation based on the cross connect information transmitted by the own NE is not performed in the NE D by receiving this cross connect setting abnormal information.

On the other hand, even in the above-described case, the cross connect setting operation has already been performed in accordance with the cross connect information shown in FIG. 10. As a consequence, the below-mentioned removing of the cross connect setting operation is carried out in the NE C and the NE A.

When the NE C receives the cross connect setting abnormal information shown in FIG. 11 transmitted from the NE B, the cross connect information detecting unit 2101a of the NE C reads the cross connect information, and further the cross connect information analyzing unit 2102a analyzes the above-explained information. Since this analyzed cross connect information corresponds to "Response" with reference to the command information, the cross connect information analyzing unit 2102a recognizes that this information corresponds to the response information of the cross connect information. Furthermore, since the command result information is read and this command result information becomes "NG", the cross connect information analyzing unit 2102a recognizes that this cross connect information is not set under normal condition.

The cross connect information detecting unit 2101a reads the setting information, and then recognizes that this read setting information becomes "Set", and the own NE is not the terminal NE based on the terminal NE information (in this case, NE D). Based on this recognition, the pass-through setting/removing judging unit 2103a recognizes the pass-through setting operation of the own NE should be removed.

Furthermore, the cross connect information analyzing unit 2102a may recognize that since this cross connect setting response information is outputted to the HG2 side, this cross connect response information is received on the HG1 side. Moreover since the setting sort information is "ADD" and the channel information is equal to "3", the cross connect information analyzing unit 2102a judges that "the pass-through setting operation from the HG2 of the third channel toward the HG1 is removed", and thus removes the cross connect pass-through setting operation of the own NE (NE C).

Also, since this cross connect information received from the cross connect HG1 side corresponds to the response information and this transmission source NE (NE A in this case) does not correspond to the own NE, this cross connect setting abnormal end information is transmitted to the HG2 side (NE A side) as a path pass-through process operation of the cross connect information.

As previously described, when the cross connect setting operation cannot be set in a half way, the commands set to the pass-through NE are sequentially removed based on the cross connect setting abnormal information. When the cross connect setting operation is again returned to the NE A corresponding to the transmission source NE, this NE A can finally recognize that the cross connect setting operation could not be performed under normal condition.

On the other hand, when the cross connect setting operation is succeeded in the NE D equal to the terminal NE, "OK" is registered into the command setting result information in this terminal NE, and is returned as the cross connect setting response information from the NE B via the NE C to the NE A. Finally, in the NE A, the cross connect information analyzing unit can recognize that the cross connect setting operation issued by the own NE can be performed under normal condition.

Figure 12:
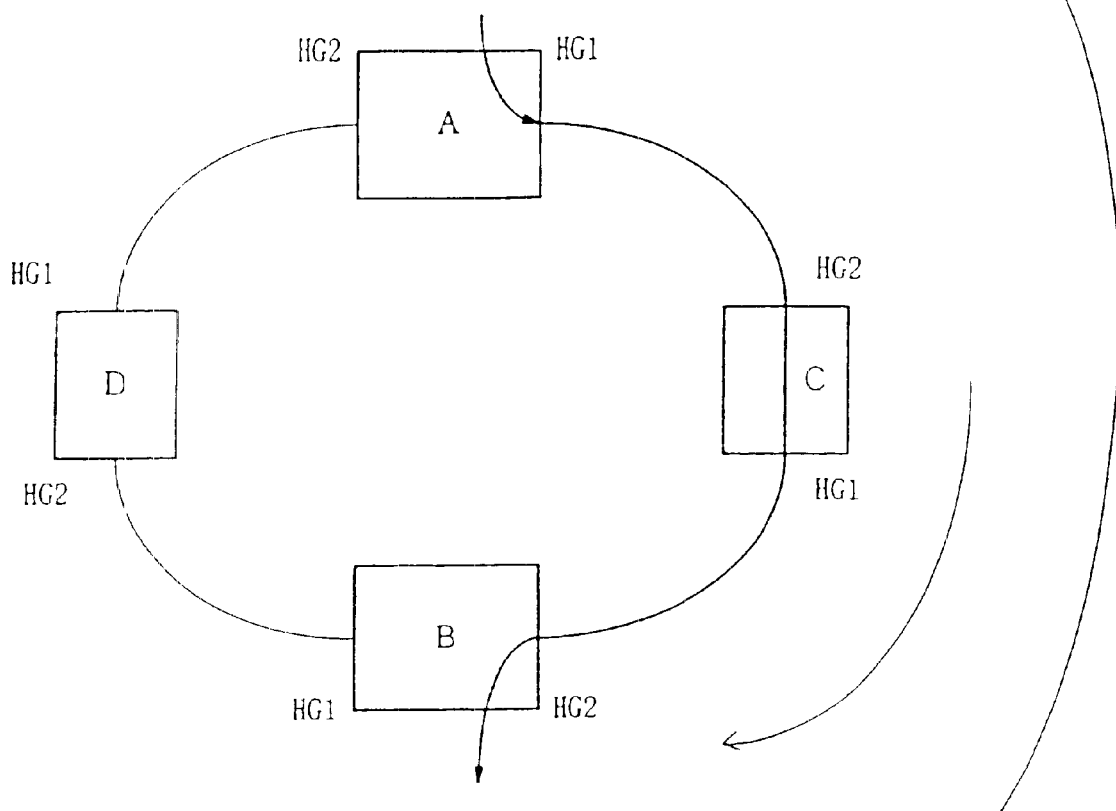
FIG. 12 is an explanatory diagram for showing cross connect information transmitted from the NE A to the NE B, and cross connect information returned from the NE A to the NE B in the embodiment mode of the present invention.

In Case That Response Information Cannot Be Received When Cross Connect Setting Operation Is Executed Considering now such a case that, as indicated in FIG. 12, a communication is established from the NE A via the NE C to the NE B by using the first channel (Channel-1) on the HG1 side.

In this case, cross connect information transmitted from the NE A is similar to the cross connect information shown in FIG. 5.

When this cross connect information is received by the NE B from the HG2 side, the NE B rewrites command information contained in the received cross connect information into "Response", and also rewrites the command setting information into "OK" which will then be sent to the HG2 side.

The NE C corresponding to the pass-through NE receives such cross connect information that the command information from the NE A is equal to "Command" at the HG2 side, and thereafter receives at the HG1 side such cross connect response information that the transmission source information, the terminal NE, the setting information, the setting sort information and the channel information are identical to the above-described cross connect information sent from the NE B, and the command information becomes "Response".

As a consequence, in the NE C for performing the pass-through cross connect setting operation, after the pass-through cross connect setting operation has been set, the NE C can judge as to whether or not the cross connect setting operation has been completed in the terminal NE.

Figure 13:
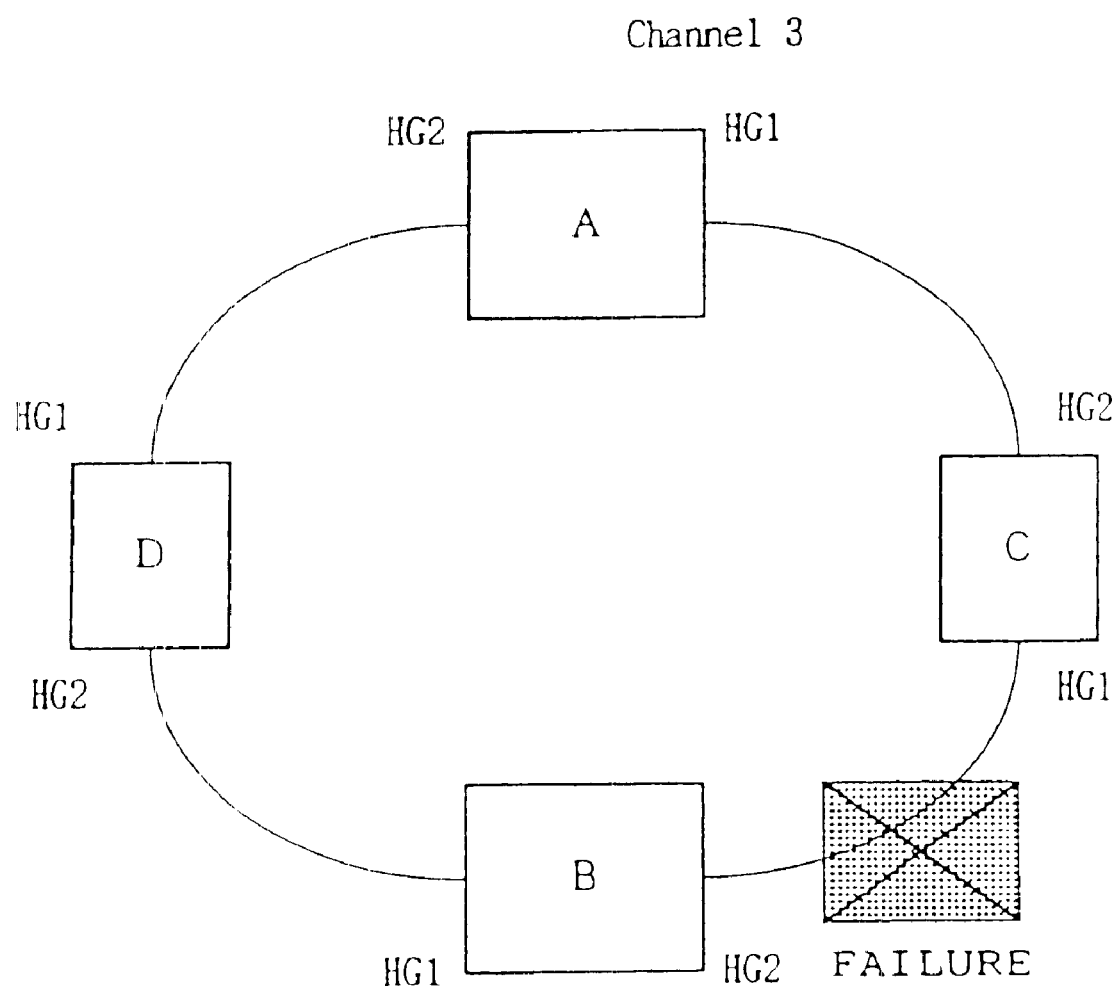
FIG. 13 is an explanatory diagram of a network arrangement for showing a condition that a failure happens to occur between the NE C and the NE B in the embodiment mode of the present invention.

However, as indicated in FIG. 13, in the case that a failure happens to occur between the NE C and the NE B, the information produced by the NE C by executing the path pass-through processing operation of the cross connect information cannot be reached to the NE B. Thus, the NE C cannot receive such cross connect response information that the command information becomes "Response". As a result, when such cross connect response information could not be received, since it may be regarded such that no cross connect information can be reached up to the NE registered in the terminal NE information (in this case, NE B), such a judgement is made that the cross connect setting operation is erroneously performed.

Referring now to a flow chart of FIG. 14, such an error judgment processing sequence will be described.

First, when the cross connect information detecting unit 2101a of the NE C detects the cross connect information, the cross connect information analyzing unit 2102a receives cross connect information whose setting information becomes "Command" from the HG2 side (step 1401). Based upon this cross connect information, the adding/dropping control unit 2107 sets the pass-through cross connect to the own NE (step 1402).

Then, the above-described cross connect information received from the HG2 side (namely, NE A side) in the NE C is transmitted to the HG1 side (namely, NE B side) (step 1403). Thereafter, a measurement by a timer employed in the time out monitoring unit 2106a is commenced (step 1404). Alternatively, at this time, the cross connect information analyzing unit 2102a may conduct the analysis information obtained from this cross connect information via the adding/dropping control unit 2107 through the cross connect editing unit 2104b on the HG2 side to the time out monitoring unit 2106b side.

Next, the NE C waits for returning of the following cross connect response information from the HG1 side (NE B side). That is, the transmission source NE information, the terminal NE information, the setting information, the setting sort information, and the channel information of this cross connect response information are identical to the above-described cross connect information, and "Response" has been registered into the command result information of this cross connect response information (step 1405). Then, when such cross connect response information is received, the NE C transmits this cross connect response information to the HG2 side (step 1406). Now, in such a case that such cross connect response information could not be received within the measuring time set as the time out by monitoring operation by the time out monitoring unit 2106a (2106b) (step 1407), setting of the pass-through cross connect set at the step 1402 is removed (step 1408).

It should also be noted that when the cross connect response information transmitted from the NE B could not be received in the NE C, in the cross connect information editing unit 2104a on the HG2 side, the command result information of the command cross connect setting information which has been received from the HG2 side and held therein is rewritten into "NG", and then this "NG" information is transmitted from the cross connect information transmitting unit 2108b to the HG2 side.

Even when a plurality of pass-through NE are present between, for instance, the NE A and the NE C, the pass-through setting operation may be sequentially removed in these pass-through NE by executing such a process operation. Also, the setting information of the cross connect information received at the step 1401 is written into "Remove", and this "Remove" is transmitted as cross connect setting remove information to the HG1 side. As a result, even when the failure occurs only in the line directed from the NE B to the NE C, and further a plurality of pass-through NE are present between the NE B and the NE C, the pass-through setting operations of the cross connect information about these pass-through NE can be sequentially removed. At this time, the NE C need not wait for the response information with respect to the cross connect setting removing information transmitted to the HG1 side. This is because even when the communication can be established from the NE C to the NE B, the communication from the NE B to the NE C cannot be established due to the failure.

Even when the failure happens to occur, the cross connect setting condition of this ring network may be returned to such a previous condition that the NE A finally transmits the cross connect information in accordance with the above-described processing operation in accordance with the above-explained process operation.

Removing Function of Bidirectional Pass-Through Setting

Figures 15, 16:
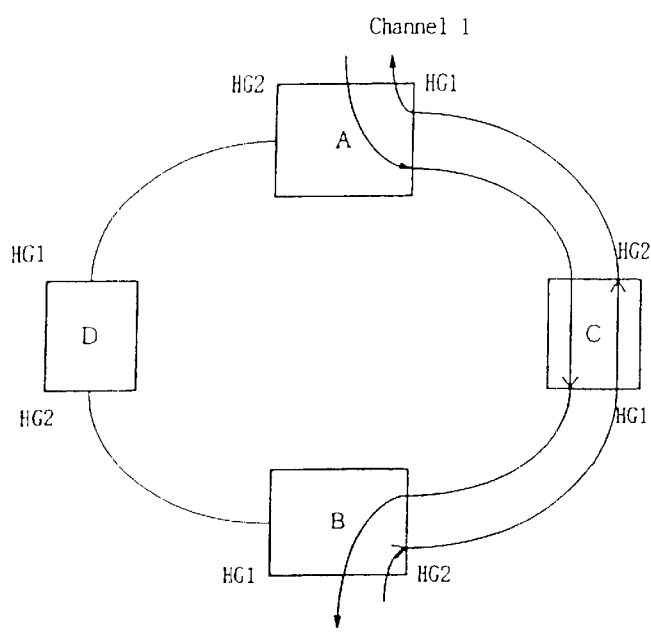
FIG. 15 is an explanatory diagram for removing a bidirectional pass through setting operation of the NE C set between the NE A and the NE C in the embodiment mode of the present invention.
FIG. 16 is an explanatory diagram for showing cross connect information used to execute a bidirectional cross connect setting operation between the NE A and the NE B in the embodiment mode of the present invention.

As indicated in FIG. 15, considering now such a case that an ADD/DROP communication is carried out between the NE A and the NE B by using the first channel (Channel-1) of the HG1 side.

The NE A transmits such cross connect information that setting method information is set to "bidirection" (2WAY) (see FIG. 16) to the HG1 side.

Similar to the above-described cross connect setting process operation, the NE C which has received such cross connect information performs "cross-connect setting of first channel passed from HG2 to HG1". In this case, since the setting method information becomes "bidirection" (2WAY), the cross connect information analyzing unit 2102a of the NE C judges that the ADD/DROP setting operation is executed at the same time. Based on this judgment, the adding/dropping control unit 2107 simultaneously executes "cross-connect-setting of first channel passed from HG1 to HG2". Then, furthermore, the adding/dropping control unit 2107 also performs a path pass-through process operation of this cross connect information, and then transfers this cross connect information to the NE B.

Even if there are provided a plurality of pass-through NE between the NE A and the NE B, at the time when the cross connection information sent from the NE A is reached to the NE B, all of the NE existing on the HG1 side of the NE A and on the HG2 side of the NE B may execute the below-mentioned pass-through setting operations, since a similar process operation to that of the NE C is carried out, namely, "pass-through setting of first channel from HG1 to HG2, and pass-through setting of first channel from HG2 to HG1".

Also, in such a case that the ADD/DROP setting is removed at the same time, "bidirection" (2WAY) is registered into the setting method information of the cross connect information transmitted from the NE A, "remove" (Remove) is registered into the command information, and then may be transmitted to the HG1 side. When this cross connection information is reached via the NE C to the NE B, any one of "pass-through setting of first channel from HG1 to HG2" and "pass-through setting of first channel from HG2 to HG1" of the pass-through NE is removed.

Setting Function of Response Information Receiving Type Cross Connect Pass-Through Considering now such a case that an ADD communication setting operation is performed between the NE A and the NE B by using the first channel of the HG1 in the NE A.

Figure 17:
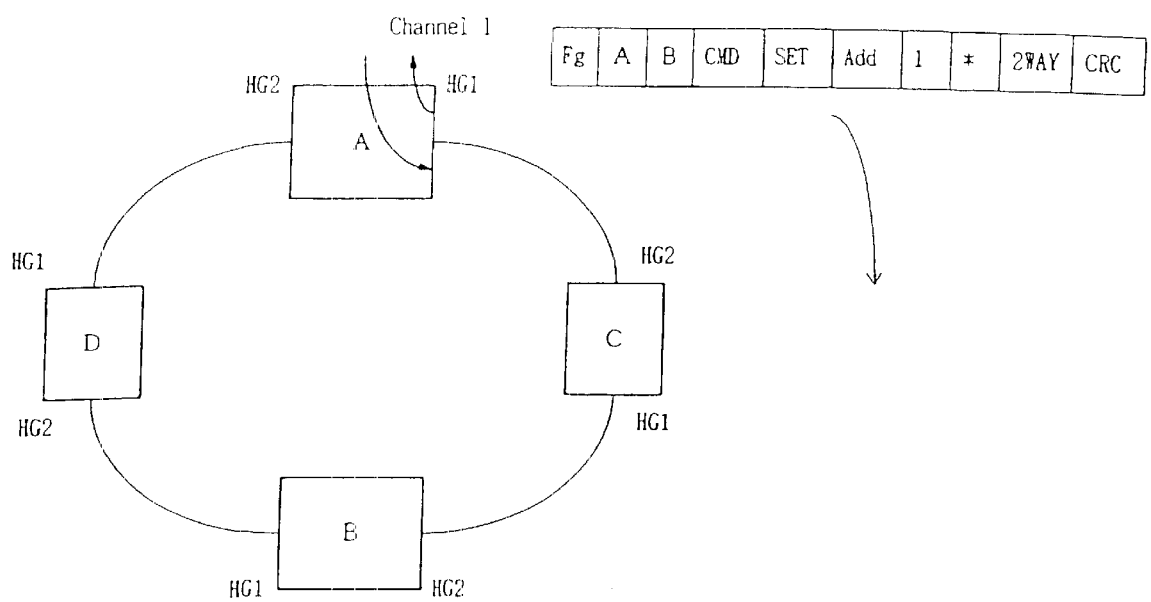
FIG. 17 is an explanatory diagram for indicating a network arrangement used to execute a bidirectional cross connect setting operation between the NE A and the NE B in the embodiment mode of the present invention.

First, as shown in FIG. 17, cross connect information is transmitted from the NE A. With respect to this cross connect information, the NE A is registered as the transmission source NE; the NE B is registered as the terminal NE; "Command" is registered as the command information; "SET" is registered as the setting information; "ADD" is registered as the setting sort information, "1" (first channel: Channel-1) is registered as the channel information; and "bidirection" (2WAY) is registered as the setting method information.

This cross connect information transmitted from the HG1 side of the NE A is received by the NE C from the HG2 side.

Figure 18:
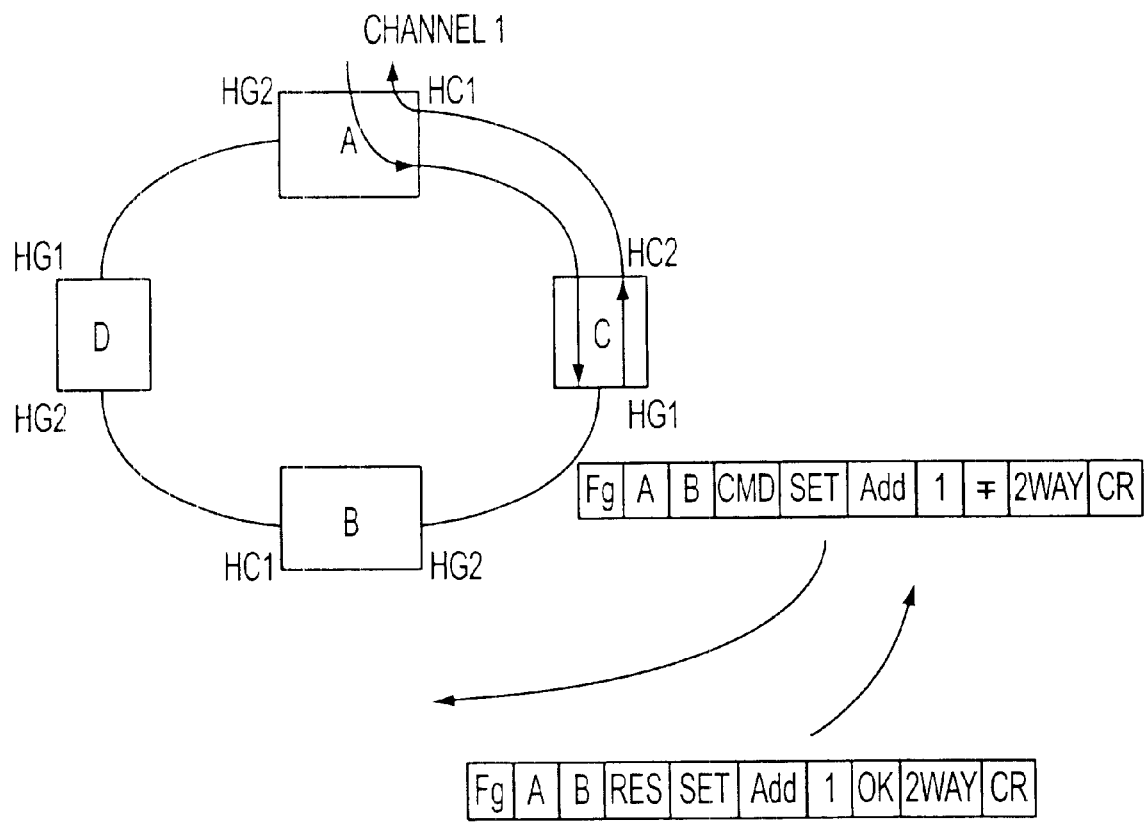
FIG. 18 is an explanatory diagram for indicating a network arrangement used to execute a bidirectional cross connect setting operation between the NE A and the NE B in the embodiment mode of the present invention.

Since the terminal NE information (NE B) of the cross connect information received in the NE C is different from the own NE information (NE C) and the command information is "Command" in the NE C, this NE C recognizes that "pass-through setting of first channel from HG2 to HG1" must be carried out. In this case, in the adding/dropping control unit 2107 of the NE C, the cross connect setting condition of the own NE is investigated, and the cross connect information received by "cross connect information path pass-through function" "if condition when pass-through cross connect setting operation is not allowed is not satisfied", is transmitted from the HG1 side through the cross connect information transmitting unit 2108a (see FIG. 18).

Next, this cross connect information is received from the HG2 side in the NE B. Since the terminal NE information (NE B) is made coincident with the own NE information, the NE C performs "cross-connect setting for dropping first channel on HG2 side" in the own NE in accordance with this cross connect information.

Next, the command information of this cross connect information is set to "Response" (RES) in the NE B, and "OK" is set to the command result information, which will then be transmitted to the HG2 side.

In the cross connect information analyzing unit 2102a of the NE C which has received the above-explained cross connect response information transmitted from the NE B, since the terminal NE information is not for the own NE but the command information is "Response" (RES), and also the command information is "OK", the NE C recognizes that the pass-through cross connect setting operation of the own NE must be changed from this cross connect response information.

Then, in the cross connect information analyzing unit 2102b of the NE C, since the setting information corresponds to "SET", this analyzing unit recognizes that such a cross connect setting operation that the data passes through the own NE must be carried out in order to realize this cross connect.

Also, since the reception direction of the cross connect information, the setting sort information, and the channel information are "HG1", "ADD", and "first channel", respectively, the adding/dropping control unit 2107 recognizes that, as indicated in FIG. 12, "pass-through setting of first channel from HG2 to HG1" must be carried out for the pass-through cross connect set in the own NE. Then, the adding/dropping control unit 2107 performs the pass-through setting operation of the above-described condition on the own NE. Thereafter, the received cross connect response information is transmitted to the HG2 side (NE A side).

Such an operation is repeatedly performed in the pass-through NE, the NE A finally receives such cross connect information whose command result information is "OK", and therefore recognizes that the condition for realizing this cross connect setting operation can be satisfied between the terminal NE (NE B) and the own NE.

In the ring network system constructed of a plurality of transfer apparatus with the cross connect functions, according to the present invention, when the line setting operation is carried out, the line setting manager need not execute the pass-through cross connect setting operation for every repeater NE. However, the line setting manager merely transmits the cross connect information from the transmission source NE, so that the pass-through setting operation of the repeater NE and the cross connect setting operation of the terminal NE can be performed.

What is claimed is:

1. A cross connect apparatus wherein in a network through which a synchronized frame signal is multiplexed and the multiplexed frame signal is transferred, said cross connect apparatus is provided at a node connected to said network so as to control one of adding, dropping, and passing-through operations of the frame signal, comprising:

cross connect information contained in said frame signal including at least a transmission source station information, a destination station information and information for setting a destination station generated in a transmission source station; and control means for analyzing said cross connect information contained in said frame signal with which a header is provided to thereby control pass-through setting of said cross-connect apparatus itself, said header containing said cross connect information for indicating whether a signal received from a predetermined node is dropped, or passes through;

said control means includes cross connect information editing means for editing said cross connect information based upon an analysis result of said cross connect information.

2. A cross connect apparatus as claimed in claim 1 wherein:

when said control means recognizes that the cross-connect apparatus itself is a terminal NE, said control means performs a cross connect setting operation of the cross-connect apparatus based on said cross connect information; produces cross connect response information through said cross connect information editing unit; and returns said cross connect response information to a transmission source NE side.

3. A cross connect apparatus as claimed in claim 1 wherein:

when the cross connect setting operation of the cross connect apparatus itself based on the content of the received cross connect information is not possible, said control means returns cross connect setting abnormal information corrected by said cross connect information editing means to a direction of a transmission source NE.

4. A cross connect apparatus as claimed in claim 3 wherein:

upon receipt of said cross connect setting abnormal information, said control means removes the cross connect setting operation executed when cross connect information corresponding to said cross connect setting abnormal information is received.

5. A cross connect apparatus wherein in a network through which a synchronized frame signal is multiplexed and the multiplexed frame signal is transferred, said cross connect apparatus is provided at a node connected to said network so as to control one of adding, dropping, and passing-through operations of the frame signal, comprising:

cross connect information contained in said frame signal including at least a transmission source station information, a destination station information and information for setting a destination station generated in a transmission source station; and control means for analyzing said cross connect information contained in said frame signal with which a header is provided to thereby control pass-through setting of said cross-connect apparatus itself, said header containing said cross connect information for indicating whether a signal received from a predetermined node is dropped, or passes through;

said control means includes timer means; commences a measurement by said timer means when said cross connect setting information is received; and returns said cross connect setting abnormal information to a direction of a transmission source NE when said cross connect response information is not received within preset time.

6. A cross connect apparatus as claimed in claim 5 wherein:

when said cross connect response information is not received within the time preset by said timer means, said control means returns said cross connect setting abnormal information to the transmission source NE side, and returns cross connect remove information to a reception NE side.

* * * * *